Dec. 15, 1931. H. S. WALKER 1,836,737
ROTARY MILLING CUTTER AND LIKE TOOL
Filed Jan. 21, 1930
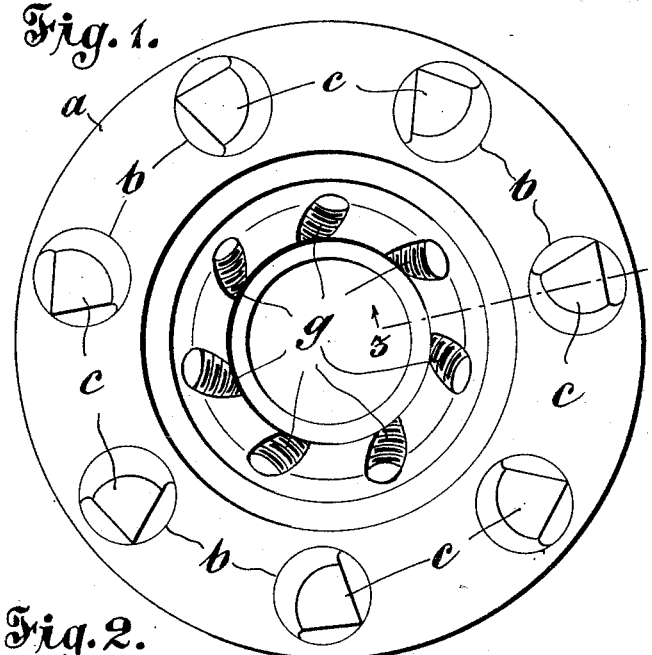
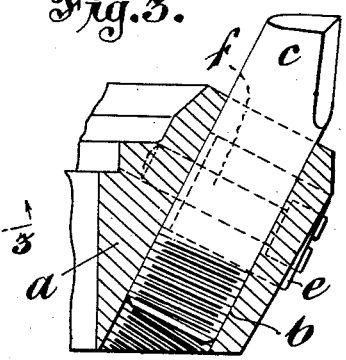
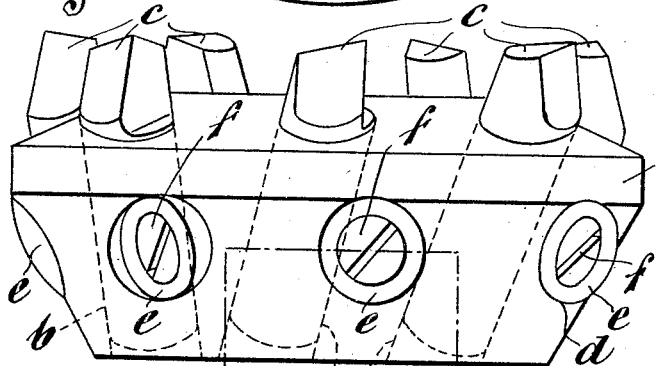
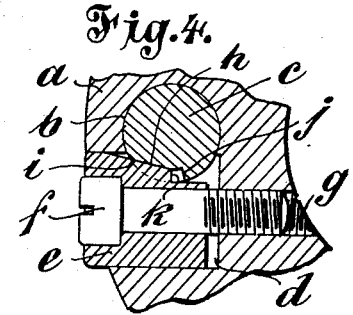
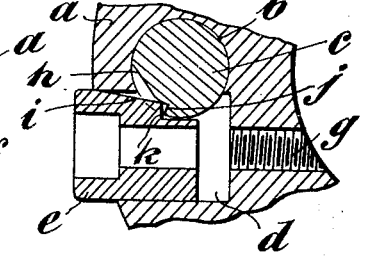
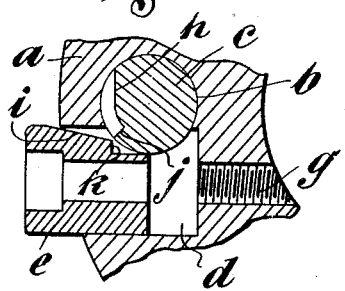
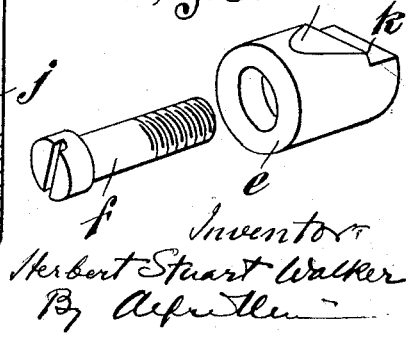
Inventor
Herbert Stuart Walker Patented Dec. 15, 1931

1,836,737

UNITED STATES PATENT OFFICE

HERBERT STUART WALKER, OF BIRMINGHAM, ENGLAND

ROTARY MILLING CUTTER AND LIKE TOOL

Application filed January 21, 1930, Serial No. 422,243, and in Great Britain February 1, 1929.

This invention is for improvements in connection with rotary milling cutters and like tools of the inserted tooth type.

This invention refers more particularly to an improved method of securing the detachable cutting teeth in position upon the rotatable cutter body, and is designed with the object of providing a rotary milling cutter or like tool in which the teeth are adjustably mounted in the body in such a manner as to ensure complete security and rigidity during the cutting operation and to be adapted for easy and expeditious release for quick adjustment or removal when required.

According to the present invention each cutting tooth is rotatably fitted into a socket in the cutter body for instance by screwing, and is adjustably and detachably secured therein by a wedging or like engagement of its shank with a sleeve or bushing or equivalent retaining member which is slidably disposed within a separate socket in the cutter body in intersecting tangential relation to the cutting tooth and is normally secured in its respective socket by a locking device, the arrangement being such that on the locking device being removed, the retaining member is adapted for a self-releasing action under the influence of the initial rotation of the cutting tooth, and this self-releasing action being preferably effected by coengagement between a longitudinal tooth or shoulder on the cutting tooth shank and a transverse tooth or shoulder on the retaining member.

In order that the invention may be clearly understood and readily carried into practice, reference may be had to the appended explanatory drawings, upon which:—

Figure 1 is a front elevation of a rotary milling cutter having the present improvements applied.

Figure 2 is a side elevation of the same.

Figure 3 is a fragmentary cross-section of the cutter, longitudinally of one of the teeth, the section being taken on the line 3—3 of Figure 1.

Figure 4 is a fragmentary view illustrating one of the teeth rigidly locked in the cutter body by means of its retaining sleeve and locking screw, the view being taken in section on the line 4—4 of Figure 2.

Figure 5 is a view similar to Figure 4 but showing the tooth in a partly released condition.

Figure 6 is a view similar to Figures 4 and 5 but showing the tooth fully released from its retaining sleeve.

Figure 7 is a view illustrating a cutting tooth in detail.

Figure 8 is a similar view of a retaining sleeve and locking screw.

In a convenient embodiment of the invention, the cutter body $a$ is provided with a series of circumferentially spaced cylindrical sockets $b$ bored obliquely and symmetrically in rearwardly convergent relation substantially parallel to the outer wall of the body, these sockets $b$ being internally screwthreaded at their inner or rearward extremities. Each socket $b$ is fitted with a forwardly projecting cutting tooth $c$ having a cylindrical shank which is externally screwthreaded at its inner or rearward extremity for engagement with the internal screw-threads of the socket, the cutting tooth $c$ being thereby adapted for a forward and rearward adjustment by a screwing action within the body $a$. Each cutting tooth socket $b$ is associated with a separate cylindrical socket $d$ bored in the cutter body $a$ at right angles to and in intersecting tangential relation to the socket $b$, this second socket $d$ accommodating a small sliding sleeve or bushing $e$ which normally lies flush with the cutter body and is secured therein by means of an axial locking pin or screw $f$ which is countersunk into the sleeve or bushing and is adapted for screw-threaded engagement into an extension $g$ of the socket $d$.

This sleeve or bushing $e$, when thus normally secured by its locking pin or screw $f$ as shown in Figures 2 to 4, serves to rigidly hold the cutting tooth $c$ in any adjusted position in which it may have been set for the cutting operation, this retaining action being effected by a wedging co-engagement (see Figure 4) between an incline $h$ on the shank of the cutting tooth $c$ and an incline $i$ on the outer cylindrical wall of the sleeve or bushing *e*, and these co-engaging inclines *h* and *i* being associated respectively with a longitudinal tooth or shoulder *j* on the cutting tooth shank and a transverse tooth or shoulder *k* on the sleeve or bushing *e*.

It will be seen that on the cutting tooth *c* being screwed into the cutter body *a*, and on the sliding sleeve or bushing *e* being secured by its locking pin or screw *f*, the cutting tooth *c* is wedged into binding engagement with the cylindrical wall of its socket *b* and is thereby secured in a particularly rigid and efficient manner (see particularly Figure 4) for the cutting operation, and it will further be seen that on the locking pin or screw *f* being removed, an initial rotation of the cutting tooth *c*, which is permitted by reason of the inclined faces *h* and *i* of the tooth and the bushing, respectively, being disposed as shown, outwardly of a plane at right angles to the axis of the bushing and including the axis of the tooth, displaces the sliding sleeve or bushing *e* outwardly by co-action (see Figure 5) between the pair of teeth or shoulders *j* and *k*, this displacement of the sliding sleeve or bushing *e* freeing the cutting tooth *c* (as shown in Figure 6) for any necessary adjustment within its screwed hole *b* or for entire removal from the cutter body *a* by a screwing movement in the appropriate direction.

What I claim as my invention and desire to secure by Letters Patent is:—

1. In a cutting tool of the inserted tooth type, a body having a pair of bores disposed in intersecting tangential relation to each other, a tooth disposed in one of said bores, a bushing disposed in the other of said bores, removable securing means for said bushing effective to force the same into locking engagement with said tooth, and means whereby rotation of said tooth following removal of said bushing securing means is effective to produce axial release movement of said bushing.

2. In a cutting tool of the inserted tooth type, a body having a pair of bores disposed in intersecting tangential relation to each other, a tooth disposed in one of said bores, a bushing disposed in the other of said bores, removable securing means for said bushing effective to force the same into locking engagement with said tooth, and cooperating shoulders on said tooth and said bushing whereby rotation of the tooth following removal of said bushing securing means is effective to produce axial release movement of the bushing.

3. In a cutting tool of the inserted tooth type, a body having a pair of bores disposed in intersecting tangential relation to each other, a tooth disposed in one of said bores, a bushing disposed in the other of said bores, removable securing means for said bushing effective to force the same into locking engagement with said tooth, said bushing having a wedging surface for engagement with said tooth and further having a shoulder adjacent to said wedging surface, and a shoulder on said tooth adapted by rotation of the tooth for cooperation with the shoulder on the bushing to produce axial release movement of the latter.

In witness whereof I have hereunto set my hand.

HERBERT STUART WALKER.